(12) United States Patent
Kern et al.

(10) Patent No.: US 6,668,530 B2
(45) Date of Patent: Dec. 30, 2003

(54) GRASS-CUTTING TRACTOR WITH IMPROVED OPERATING FEATURES

(75) Inventors: Robert D. Kern, Waukesha, WI (US); Gerald C. Ruehlow, Oconomowoc, WI (US); Steven J. Wilcox, Delafield, WI (US); Francis X. Wedel, Lake Mills, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 10/097,222

(22) Filed: Mar. 13, 2002

(65) Prior Publication Data

US 2003/0172635 A1 Sep. 18, 2003

(51) Int. Cl.[7] ............................................... A01D 69/00
(52) U.S. Cl. ........................................ 56/10.8; 123/361
(58) Field of Search ................. 56/10.8, 11.1, 56/10.2 A; 123/361, 352, 376, 350, 353

(56) References Cited

U.S. PATENT DOCUMENTS

| | | |
|---|---|---|
| 2,600,368 A | 6/1952 | Winkler |
| 3,749,069 A | 7/1973 | Reese |
| 4,084,559 A | 4/1978 | Wallbaum |
| 4,440,128 A | 4/1984 | Nakano et al. |
| 4,463,723 A | 8/1984 | Tansuwan |
| 4,517,942 A | 5/1985 | Pirkey et al. |
| 4,523,561 A | 6/1985 | Kosuge |
| 4,539,483 A | 9/1985 | Freeny, Jr. |
| 4,768,478 A | 9/1988 | Martel |
| 4,773,371 A | 9/1988 | Stenz |
| 4,884,541 A * | 12/1989 | Marriott ..................... 123/361 |
| 5,020,309 A | 6/1991 | Hopkins |
| 5,032,737 A | 7/1991 | Holm et al. |
| 5,209,196 A | 5/1993 | Nickel et al. |
| 5,325,650 A * | 7/1994 | Fuse et al. ............... 56/10.2 R |
| 5,417,193 A * | 5/1995 | Fillman et al. ............. 123/352 |
| 5,520,253 A | 5/1996 | Kesting |
| 5,540,037 A * | 7/1996 | Lamb et al. ..................... 56/7 |
| 5,682,858 A | 11/1997 | Chen et al. |
| 5,794,422 A | 8/1998 | Reimers et al. |
| 6,014,996 A | 1/2000 | Egging et al. |
| 6,067,495 A * | 5/2000 | Fliearman et al. ............ 701/55 |
| 6,082,084 A | 7/2000 | Reimers et al. |
| 6,109,009 A | 8/2000 | Benson |
| 6,205,385 B1 * | 3/2001 | Stelzle et al. ................. 701/50 |
| 6,339,916 B1 * | 1/2002 | Benson .................... 56/10.2 R |

* cited by examiner

*Primary Examiner*—Árpád Fab Kovács
(74) *Attorney, Agent, or Firm*—Boyle Fredrickson Newholm Stein & Gratz S.C.

(57) ABSTRACT

A grass-cutting tractor has an internal combustion engine, an apparatus which changes engine speed, and a generator. The apparatus includes a user-manipulated mechanism having a plurality of operating positions. Two of the operating positions are each identified by different grass-related mnemonics, e.g., NORMAL, HEAVY, MEDIUM, HIGH, REGULAR or TALL, which relate to the height of the grass to be cut and one of the positions corresponds to operation of the generator.

12 Claims, 3 Drawing Sheets

GRASS-CUTTING TRACTOR WITH IMPROVED OPERATING FEATURES

FIELD OF THE INVENTION

This invention relates generally to internal combustion engines in lawn-cutting machines, and in particular, to a grass-cutting tractor incorporating improved operating features, as well as, an auxiliary generator for electrically powering other types of equipment.

BACKGROUND OF THE INVENTION

Grass-cutting tractors are available in a wide variety of configurations including riding mowers, lawn tractors, garden tractors, so-called compact tractors and larger commercial tractors. A riding mower is often characterized by a rear-mounted, vertical shaft engine and is configured only for grass cutting. A lawn tractor is configured more like a conventional farm tractor in having a front mounted engine, rear driving wheels and an operator's seat between the engine and the driving wheels. A lawn tractor is configured primarily for grass cutting but is likely to have towing capability and other non-ground-engaging implements, e.g., a snow blower or snow plow. A garden tractor is similar in many respects to a lawn tractor but, in addition, has a ground-engaging implement, e.g., a rotary tiller or toothed plow. A compact tractor and a commercial tractor are typically large lawn tractors that may be fitted with any of a variety of implements. As used in this specification, the phrases "lawn tractor" and "grass-cutting tractor" contemplate all of the foregoing.

Grass-cutting tractors have been popular for many years with property owners, residential and commercial alike. For lawns of smaller area, as in a residential setting, one might consider such a mower as a luxury. But as lawn area increases, mechanized mowing tends toward becoming a virtual necessity, at least in the view of the property owner. For example, mechanized mowing is a necessity for wide expanses of grass such as are found at golf courses The control of a grass-cutting tractor involves manipulation of at least two aspects of the tractor's operation, namely, the over-the-ground speed and the mower blade speed. A conventional approach to controlling both aspects is to set the engine speed (and, therefore, the blade speed) at a substantially maximum speed and controlling over-the-ground speed using a multiple-step mechanical transmission or an infinitely-variable hydrostatic transmission.

By way of example, U.S. Pat. No. 4,773,371 (Stenz) discloses a grass-cutting tractor wherein the engine operates at constant speed, irrespective of the horsepower required to cut grass. However, it can be appreciated that the running of the engine of the grass-cutting tractor at a constant, substantially-maximum speed has some disadvantages. By running the engine at substantially-maximum speed, the rate of engine wear per unit of tractor operating time is increased. Further, the running of the engine at substantially-maximum speed increases the noise generated by the grass-cutting tractor to an unnecessarily high level as compared to the noise level generated when operating the engine at less than maximum speed.

In addition to utilizing a grass-cutting tractor, property owners often times utilize other types of lawn care accessories or tools such as lawn edgers, blowers, electric chain saws and the like to maintain the aesthetic appearance of their property. These types of lawn care accessories require electrical power in order to operate. As such, the property owner must provide electrical power at the location where use of such lawn care accessories is required. Typically, electrical power is provided at a specific location on the property by use of an extension cord that runs from an electrical outlet to the location. Since grass-cutting tractors may be transported to any location on the property, it would be highly desirable to provide a source of electrical power on the grass-cutting tractor. Therefore, an improved grass-cutting tractor which addresses disadvantages of the prior art would be an important advance in this field of technology.

Therefore, it is a primary object and feature of the present invention to provide an improved grass-cutting tractor overcoming some of the problems and shortcomings of the prior art.

It is further object and feature of the present invention to provide an improved grass-cutting tractor which reduces the rate of engine wear for certain grass conditions.

It is a still further object and feature of the present invention to provide an improved grass-cutting tractor which reduces tractor noise for certain grass conditions.

It is a still further object and feature of the present invention to provide an improved grass-cutting tractor which also may be utilized as a source of electrical power.

It a still further object and feature of the present invention to provide an improved grass-cutting tractor which is easy to operate, whether cutting grass or transporting the tractor from place to place.

In accordance with the present invention, an improvement in a grass cutting tractor is provided. The grass cutting tractor includes an internal combustion engine and apparatus which changes engine speed. The improvement comprises the apparatus including a user manipulated mechanism having first, second and third operating positions. The second and third operating positions are each identified by a different grass-related mnemonic relating to the height of the grass to be cut.

The engine includes a throttle and an electrical device producing an outward signal that represents engine speed. The tractor includes an electronic controller having a microprocessor coupled to the throttle and to the mechanism. The second and third operating positions select second and third inputs, respectively, to the microprocessor. The engine speeds substantially correspond to predetermined speeds represented by the input selected.

It is contemplated to provide a panel having first, second and third actuators for selecting the first, second and third operating positions, respectively. Alternatively, a lever may be mounted to the lawn tractor for movement between the first, second and third operating positions. The grass-related mnemonics identifying the second and third operating positions are selected from the group of mnemonic including normal, heavy, medium, high, regular and tall. The first operating position is identified by an engine related mnemonic related to engine speed. The first, second and third operating positions correspond with first, second and third engine speeds, respectively.

A generator may be operatively connected to the engine for generating electrical power having a magnitude and a frequency. The user manipulated mechanism of the apparatus includes a fourth operating position. The fourth operating position being identified by a mnemonic relating to operation of the generator. The fourth operating position selects a predetermined input to the microprocessor and the engine speed substantially corresponds to a predetermined speed presented by the input.

In accordance with a further aspect of the present invention, a grass cutting tractor is provided. The grass-cutting tractor includes an internal combustion engine and an apparatus operatively connected to the engine for adjusting engine speed. The apparatus includes a user manipulated mechanism having a plurality of operating positions. At a least a portion of the plurality of operating positions is identified by different speed related mnemonics relating to the grass to be cut.

The engine includes a throttle and a tractor includes an electronic controller having a microprocessor coupled to the throttle and to the mechanism. Each operating position selects a corresponding input to the microprocessor. The engine speed substantially corresponds to predetermined speeds represented by the selected input.

A generator may be operatively connected to the engine for generating electrical power having a magnitude and a frequency. The user manipulated mechanism of the apparatus has a generator operating position. The generator operating position being identified by a mnemonic relating to operation of the generator. The generator operating position selects a predetermined input to the microprocessor and the engine speed substantially corresponds to a predetermined speed represented by the input.

In accordance with a further aspect of the present invention, a method is provided for operating a grass-cutting tractor. The tractor includes an internal combustion engine, a cutting blade for cutting grass, a generator for generating electrical power having a magnitude and frequency, an engine throttle coupled to the engine, an electronic controller having a microprocessor coupled to the throttle, and a user manipulated mechanism having a first grass cutting operating position and a generator operating position. The method includes the steps of selecting one of the operating positions and driving the generator with the engine in response to the selection of the generator operating positions.

The method may include the additional step of driving the cutting blade with the engine in response to the selection of the first grass cutting position. The user manipulated mechanism may also include second and third grass cutting operations positions. The method comprising the further step of operating the engine at an engine speed corresponding to the operating position selected. It is also contemplated to vary the speed of the engine in response to current demand of the generator.

In accordance with a further aspect of the present invention, an improvement in a riding tractor for cutting grass is provided. The riding tractor includes an internal combustion engine having a throttle. The improvement comprises a user manipulated mechanism having plural operating positions. An electrical generator driven by the engine is provided for generating electrical power to power a tool. An electronic controller having a microprocessor is coupled to the throttle and to the mechanism. When the user manipulated mechanism is in a first operating position, the microprocessor regulates the throttle to maintain a substantially constant output voltage produced by the generator. When the user manipulated mechanism is in the second operating position, the microprocessor regulates the throttle to maintain the substantially constant engine speed. The plural operating positions includes first, second and third operating positions. The second and third operating positions select second and third input respectively to the microprocessor. The engine speed substantially corresponds to a predetermined speed represented by the selected input. The second and third operating positions are identified by mnemonics relating to the height of the grass to be cut.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
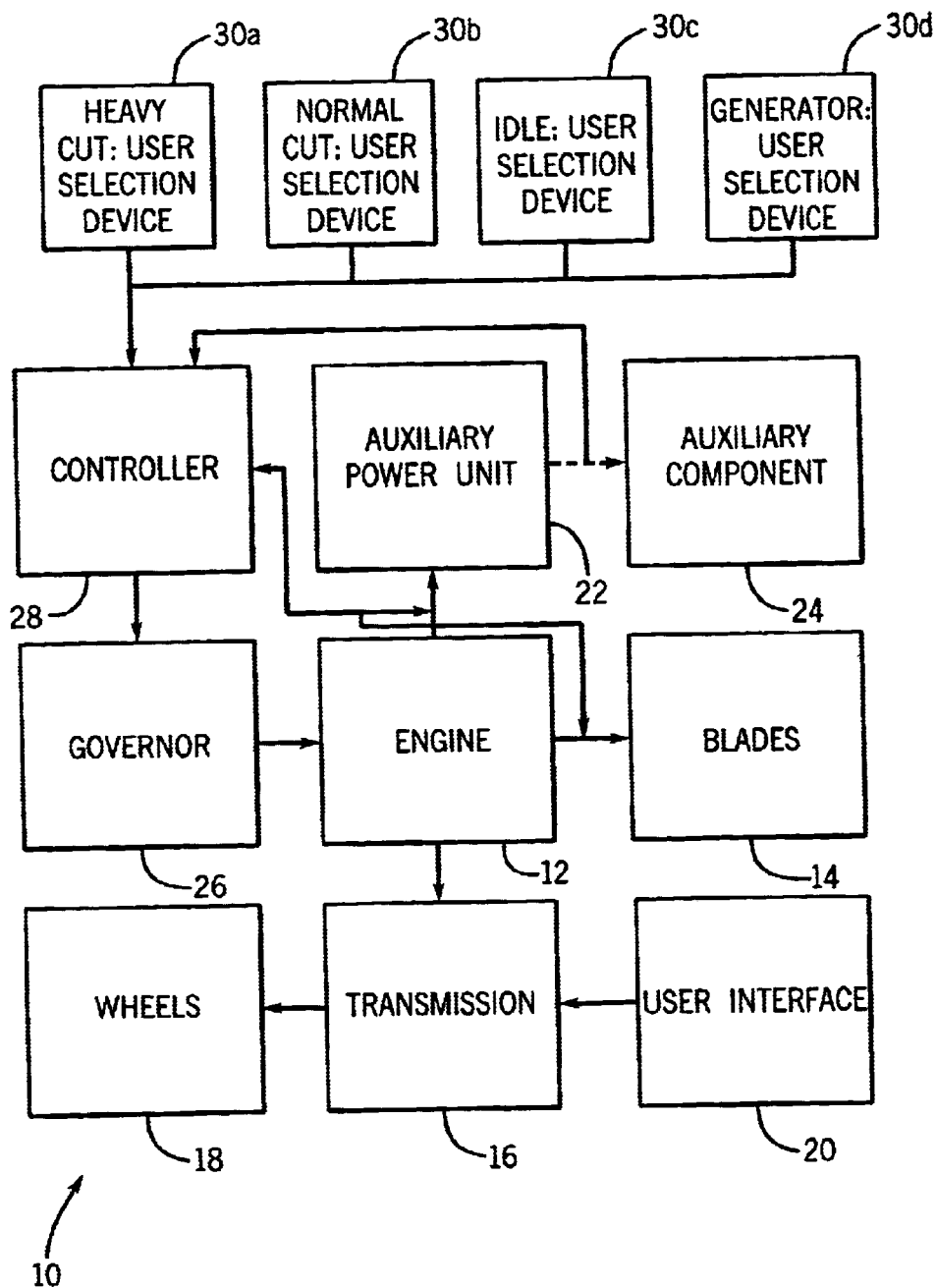
FIG. 1 is a block diagram of a lawn tractor in accordance with the present invention.

Referring to FIG. 1, a block diagram of a lawn tractor in accordance with the present invention is generally designated by the reference numeral 10. Lawn tractor 10 includes a conventional engine 12 that receives fuel, such as gasoline, diesel fuel or liquid propane vapor, through an intake. The fuel provided to engine 12 is compressed and ignited within the cylinders thereof so as to generate reciprocating motion of the pistons of engine 12. The reciprocating motion of the pistons of engine 12 is converted to rotary motion by a crankshaft. The crankshaft of engine 12 is selectively connected to rotatable blades 14 by a blade drive shaft such that as the crankshaft is rotated by operation of engine 12, the blade drive shaft rotates blades 14 that, in turn, are used to cut grass.

Governor 26 is operatively connected to the throttle of engine 12 which controls the volume of intake air to engine 22. As is known, governor 26 protects engine 22 from overspeed conditions and maintains engine 12 at a desired engine speed. Governor 26 controls the engine speed of engine 12 by regulating the position of the throttle, and hence, the amount of fuel and air provided to the combustion chamber of engine 12. As is known, the throttle is movable between a wide-open position wherein engine 12 runs at full power and a closed position wherein engine runs at minimum power.

Lawn tractor 10 further includes a transmission 16, such as a multi-step mechanical transmission or infinitely variable hydrostatic transmission, for interconnecting the crankshaft of engine 12 and the driving wheels 18 of lawn tractor 10. Transmission 16 includes an input shaft and an output shaft. As is conventional, the crankshaft turns an input shaft on transmission 16. The output shaft of transmission 16 is operatively connected to driving wheels 18. The speed of rotation of the output shaft of transmission 16 may be adjusted so as to turn driving wheels 18 at a user desired speed. User interface 20, such as a foot pedal or the like, is operatively connected to the transmission for allowing a user of lawn tractor 10 to adjust the speed of rotation of the output shaft of transmission 16, and hence, the over-ground speed of lawn tractor 10.

Lawn tractor 10 further includes an auxiliary power unit 22, such as an electrical generator, that is selectively connected to engine 12 by a generator drive shaft such that as the crankshaft is rotated by operation of engine 12, the generator drive shaft drives auxiliary power unit 22, for reasons hereinafter described. As is conventional, auxiliary power unit 22 converts the mechanical energy generated by engine 12 to electrical power at the outputs thereof for use by auxiliary component 24, such a lawn and garden tool or the like.

Figure 2:
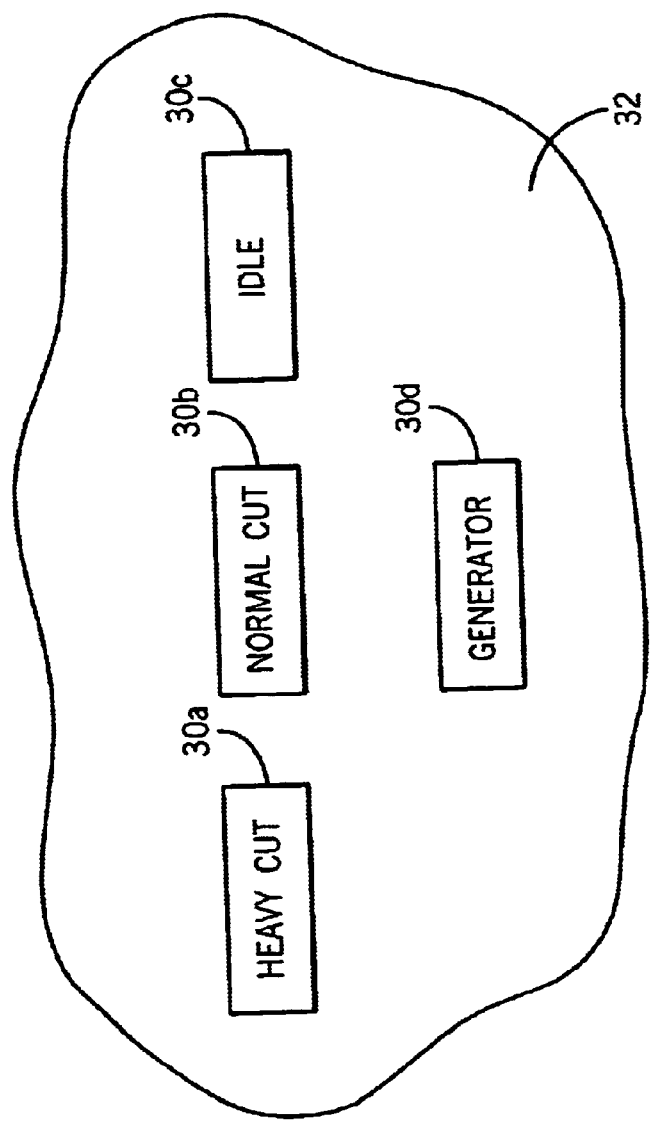
FIG. 2 is a schematic view of a panel for the lawn tractor of the present invention.

Controller 28 is operatively connected to governor 26, the blade drive shaft and generator drive shaft. Controller 28 includes a microprocessor having a plurality of inputs operatively connected to a corresponding plurality of user selection devices 30a–30d for allowing a user of lawn tractor 10 to control the operation thereof. Referring to FIG. 2, user selection devices 30a–30d may take the form of switches, pushbuttons or the like mounted on a panel 32 of lawn tractor 10. User selection devices 30a and 30b are identified by a different grass-related mnemonic relating to the height of the grass to be cut. By way of example, user selection device 30a may be identified with the grass-related mnemonics such as HEAVY, HIGH or TALL; user selection device 30b may be identified with the grass-related mnemonics such as NORMAL, MEDIUM or REGULAR; user selection device 30c may be identified by the mnemonic IDLE; and user selection device 30d may be identified by the mnemonic GENERATOR.

Figure 3:
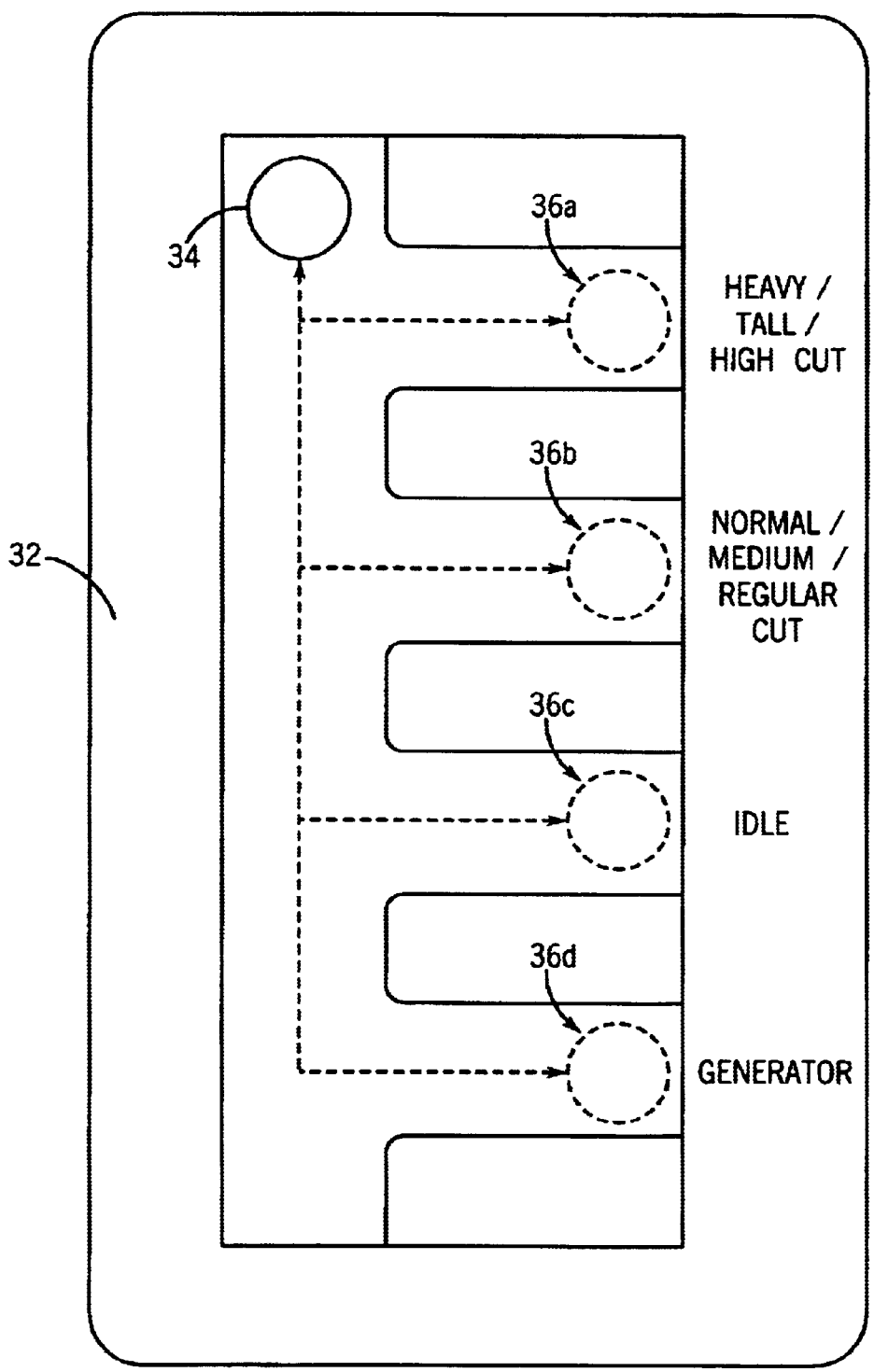
FIG. 3 is a schematic view of an alternate panel for the lawn tractor of the present invention.

Alternatively, as best seen in FIG. 3, user selection devices 30a–30d may take the form of lever 34 movable between a plurality of positions 36a–36d. As hereinafter described, the operating parameters of lawn tractor 10 are controlled by moving lever 34 into a desired position 36a–36d. With lever 34 in the user desired position 36a–36d, an input signal corresponding to such position 36a–36d is provided to the inputs of the microprocessor of controller 28 for selecting the operating parameters for lawn tractor 10. By way of example, position 36a may be identified with the grass-related mnemonic such as HEAVY/TALL/HIGH CUT; position 36b may be identified with the grass-related mnemonic such as NORMAL/MEDIUM/REGULAR CUT; position 36c may be identified by the mnemonic IDLE; and position 36d may be identified by the mnemonic GENERATOR. It is contemplated to provide user selection devices 30a–30d or lever 34 at a position on lawn tractor 10 that is easily accessible by a user thereof.

In operation, a user starts engine 12 in any conventional manner. By way of example, a starting key may be rotated with one hand, while with the other hand, the user manually bypasses a speed-setting hand lever past the maximum speed point into a proper choke range. With the engine 12 running, a user actuates one of the plurality of user selection devices 30a–30d that corresponds the desired operation of lawn tractor 10. As heretofore described, the operation initiated by actuation of a desired user selection device 30a–30d is identified by the mnemonics heretofore described.

If a user actuates user selection device 30a identified with the grass-related mnemonic HEAVY, a corresponding input is provided to the microprocessor of controller 28. The microprocessor of controller 28 controls operation of governor 26 such as that governor 26 adjusts the position of the throttle of engine 12 to the wide open position wherein engine 12 runs at full power. In addition, controller 28 operatively connects the blade drive shaft to the crankshaft such that rotation of the crankshaft by engine 12 results in rotation of blades 14. Controller 28 continues to monitor engine 12 in order to maintain engine 12 at the desired engine speed.

If a user actuates a user selection device 30b identified with the grass related mnemonic NORMAL, a corresponding input is provided to the microprocessor of controller 28. The microprocessor of controller 28 controls operation of governor 26 such that governor 26 adjusts the position of the throttle of engine 12 to an intermediate position between the wide open position and the closed position such that engine 12 runs at an intermediate speed. In addition, as heretofore described, controller 28 operatively connects the blade drive shaft to the crankshaft such that the rotation of the crankshaft by engine 12 results in rotation of blades 14. Controller 28 continues to monitor engine 12 in order to maintain engine 12 at the desired engine speed.

If the user actuates user selection device 30c identified with the grass related mnemonic IDLE, a corresponding input is provided to the microprocessor of controller 28 controls operation of governor 26 such that governor 26 adjusts the position of the throttle of engine 12 to the closed position wherein engine 12 runs at a minimum speed. In addition, controller 28 disconnects the blade drive shaft from the crankshaft such that crankshaft no longer rotates blades 14. Controller 28 continues to monitor engine 12 in order to maintain engine 12 at the desired engine speed.

If a user actuates user selection device 30d identified with the mnemonic GENERATOR, a corresponding input is provided to the microprocessor of controller 28. In response thereto, controller 28 operatively connects the generator drive shaft to the crankshaft such that the rotation of the crankshaft by engine 12 drives auxiliary power unit 22. In addition, the microprocessor of controller 28 controls operation of governor 26 such that the governor 26 adjusts the position of the throttle of engine 12 in order to maintain the frequency of electrical power generated by auxiliary power unit 22. As is conventional, auxiliary power unit 22 generates an AC voltage having a magnitude and a frequency and an AC current having a magnitude and a frequency. The magnitude of the output voltage of auxiliary power unit 22 may be monitored by a voltage regulator. Auxiliary power unit 22 may also include an armature winding or exciter which controls the magnitude of the AC output voltage generated by auxiliary power unit 22. The voltage regulator acts to increase or decrease the excitation of the exciter of auxiliary power unit 22 to the degree to maintain the magnitude of the AC output voltage at a desired value.

It is contemplated that controller 28 monitor the current drawn by auxiliary component 24 electrically coupled to the outputs of auxiliary power unit 22. If auxiliary component 24 does not draw current from auxiliary power unit 22 for a predetermined period of time (e.g. if the auxiliary component 24 is turned off), controller 28 adjusts the position of the throttle of engine 12, as heretofore described, to the closed position wherein engine 12 runs at a minimum speed. This, in turn, reduces tractor noise and reduces the rate of engine wear. If controller 28 senses that auxiliary component 24 is beginning to draw current from auxiliary power unit 22, controller 28 causes governor 26 to adjust the position of the throttle of engine 12, as heretofore described.

While the principles of the invention have been shown and described in connection with a few preferred embodiments, it is to be understood clearly that such embodiments are by way of example and are not limiting.

What is claimed:

1. In a grass-cutting tractor having cutting blades, an internal combustion engine and an apparatus which changes engine speed, the engine including a throttle, crankshaft connectable to the cutting blades, the improvement wherein:

the apparatus includes a user-manipulated mechanism having first, second, third and fourth operating positions;

an electronic controller having a microprocessor coupled to the throttle, to the user-manipulated mechanism and to the engine for monitoring the engine speed;

the first, second, third and fourth operating positions select first, second, third and fourth inputs, respectively, to the microprocessor;

the engine speed substantially corresponds to a predetermined speed represented by the input selected;

a generator including a drive shaft that is connectable to the engine, the generator generating electrical power having a magnitude and a frequency;

the first operating position is identified by an engine-related mnemonic relating to engine speed;

the second and third operating positions are each identified by a different grass-related mnemonic relating to the height of the grass to be cut; and the fourth operating position being identified by a mnemonic relating to operation of the generator;

wherein the electronic controller selectively couples the crankshaft of the engine to the drive shaft of the generator in response to receipt of the fourth input by the microprocessor from the user manipulated mechanism in the fourth operating position.

2. The tractor of claim 1 wherein the user-manipulated mechanism includes a panel having first, second and third actuators for selecting the first, second, third and fourth operating positions, respectively.

3. The tractor of claim 1 wherein the user-manipulated mechanism includes a lever mounted for movement between the first, second, third and fourth operating positions.

4. The tractor of claim 1 wherein the grass-related mnemonics identifying the second and third operating positions are selected from a group of mnemonics including NORMAL, HEAVY, MEDIUM, HIGH, REGULAR and TALL.

5. The tractor of claim 1 wherein the first operating position is identified by an engine-related mnemonic relating to engine speed.

6. A grass-cutting tractor, comprising:

an internal combustion engine having a throttle;

a generator having a drive shaft connectable to the engine, the generator generating electrical power having a magnitude and a frequency;

an apparatus operatively connected to the engine for adjusting engine speed, the apparatus includes a user-manipulated mechanism having a plurality of operating positions including a generator operating position, the generator operating position being identified by a mnemonic relating to operation of the generator;

an electronic controller having a microprocessor coupled to the throttle and to the mechanism, the electronic controller coupling the drive shaft of the generator to the crankshaft in response to the user-manipulated mechanism being in the generator operating position;

wherein at least a portion of the plurality of operating positions is identified by a different speed-related mnemonic relating to the grass to be cut.

7. The tractor of claim 6 wherein each operating position selects a corresponding input to the microprocessor; and the engine speed substantially corresponds to a predetermined speed represented by the selected input.

8. The tractor of claim 7 wherein the generator operating position selects a predetermined input to the microprocessor; and the engine speed substantially corresponds to a predetermined speed represented by the input.

9. A method for operating a grass-cutting tractor, the tractor including an internal combustion engine, a cutting blade for cutting grass, a generator for generating electrical power having a magnitude and a frequency, an engine throttle coupled to the engine and having a crankshaft, an electronic controller having a microprocessor coupled to the throttle, and a user-manipulated mechanism having a first grass-cutting operating position and generator operating position, the method including the steps of:

selecting one of the operating positions; and coupling the generator to the crankshaft of the engine in response to selection of the generator operating position.

10. The method of claim 9 comprising the additional step of driving the cutting blade with the engine in response to the selection of the first grass-cutting operating position.

11. The method of claim 9 comprising the additional step of varying the speed of the engine in response to current demanded of the generator.

12. The method of claim 9 wherein the user-manipulated mechanism further includes second and third grass-cutting operating positions, and wherein the method further comprises the step of operating the engine at an engine speed corresponding to the operating position selected.

* * * * *